United States Patent
Kumar et al.

(10) Patent No.: US 12,218,504 B2
(45) Date of Patent: Feb. 4, 2025

(54) BIPOLE POWER TRANSMISSION NETWORKS

(71) Applicant: General Electric Technology GmbH, Baden (CH)

(72) Inventors: Amit Kumar, Stafford (GB); Andrzej Adamczyk, Stafford (GB); Omar Jasim, Stafford (GB); Si Huy Quoc Dang, Stafford (GB); Rajaseker Reddy Ginnareddy, Stafford (GB)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 58 days.

(21) Appl. No.: 18/182,535

(22) Filed: Mar. 13, 2023

(65) Prior Publication Data

US 2023/0318301 A1    Oct. 5, 2023

(30) Foreign Application Priority Data

Mar. 29, 2022    (EP) ..................................... 22275035

(51) Int. Cl.
*H02J 3/18* (2006.01)
*H02J 3/36* (2006.01)
(Continued)

(52) U.S. Cl.
CPC ................................... *H02J 3/36* (2013.01);
*H02J 3/18* (2013.01); *H02J 3/38* (2013.01);
*H02M 7/7575* (2013.01)

(58) Field of Classification Search
CPC .... H02H 7/268; H02J 3/18; H02J 3/36; H02J 3/38; H02J 3/381; H02J 3/48; H02J 3/50;
(Continued)

(56) References Cited

U.S. PATENT DOCUMENTS

2008/0217995 A1* 9/2008 Hirose .................. H02G 15/34
                                                                      307/1
2009/0316446 A1* 12/2009 Astrom ................. H02H 7/268
                                                                      363/35
(Continued)

FOREIGN PATENT DOCUMENTS

EP        3883084 A1    9/2021

OTHER PUBLICATIONS

Extended European Search Report issued in EP Application No. 22275035.8 dated Sep. 21, 2022, 10 pages.
(Continued)

*Primary Examiner* — Levi Gannon
(74) *Attorney, Agent, or Firm* — Eversheds Sutherland (US) LLP

(57) ABSTRACT

A bipole power transmission network includes a first upstream power converter which has a first DC terminal that is connected with a first transmission conduit which extends, in-use, to a first downstream power converter. The first upstream power converter has a second DC terminal that is connected with a return conduit which extends, in-use, to the first downstream power converter and a second downstream power converter. The first upstream power converter has at least one first AC terminal electrically connected with a first AC power source. The bipole power transmission network includes a second upstream power converter which has a third DC terminal that is connected with the return conduit, and a fourth DC terminal which is connected with a second transmission conduit that extends, in-use, to the second downstream power converter, and at least one second AC terminal electrically connected with a second AC power source.

20 Claims, 1 Drawing Sheet

(51) Int. Cl.
    *H02J 3/38*       (2006.01)
    *H02M 7/757*      (2006.01)
(58) Field of Classification Search
    CPC ............ H02J 2300/28; H02M 1/0009; H02M 7/7575; Y02E 60/60
    See application file for complete search history.

(56)            References Cited

U.S. PATENT DOCUMENTS

| 2013/0128630 | A1  | 5/2013 | Jensen et al. |
| 2018/0145499 | A1* | 5/2018 | Gupta ................... H02H 7/268 |
| 2020/0266721 | A1* | 8/2020 | Mukhedkar ............... H02J 3/36 |
| 2023/0082909 | A1* | 3/2023 | Barker ................... H02J 3/381 |
|              |     |        |        307/82 |

OTHER PUBLICATIONS

Korompili Asimenia et al: Review of VSC HVDC Connection for Offshore Wind Power Integration. Renewable and Sustainable Energy Reviews, vol. 59, Dec. 31, 2016 (Dec. 31, 2016), pp. 1405-1414.

* cited by examiner

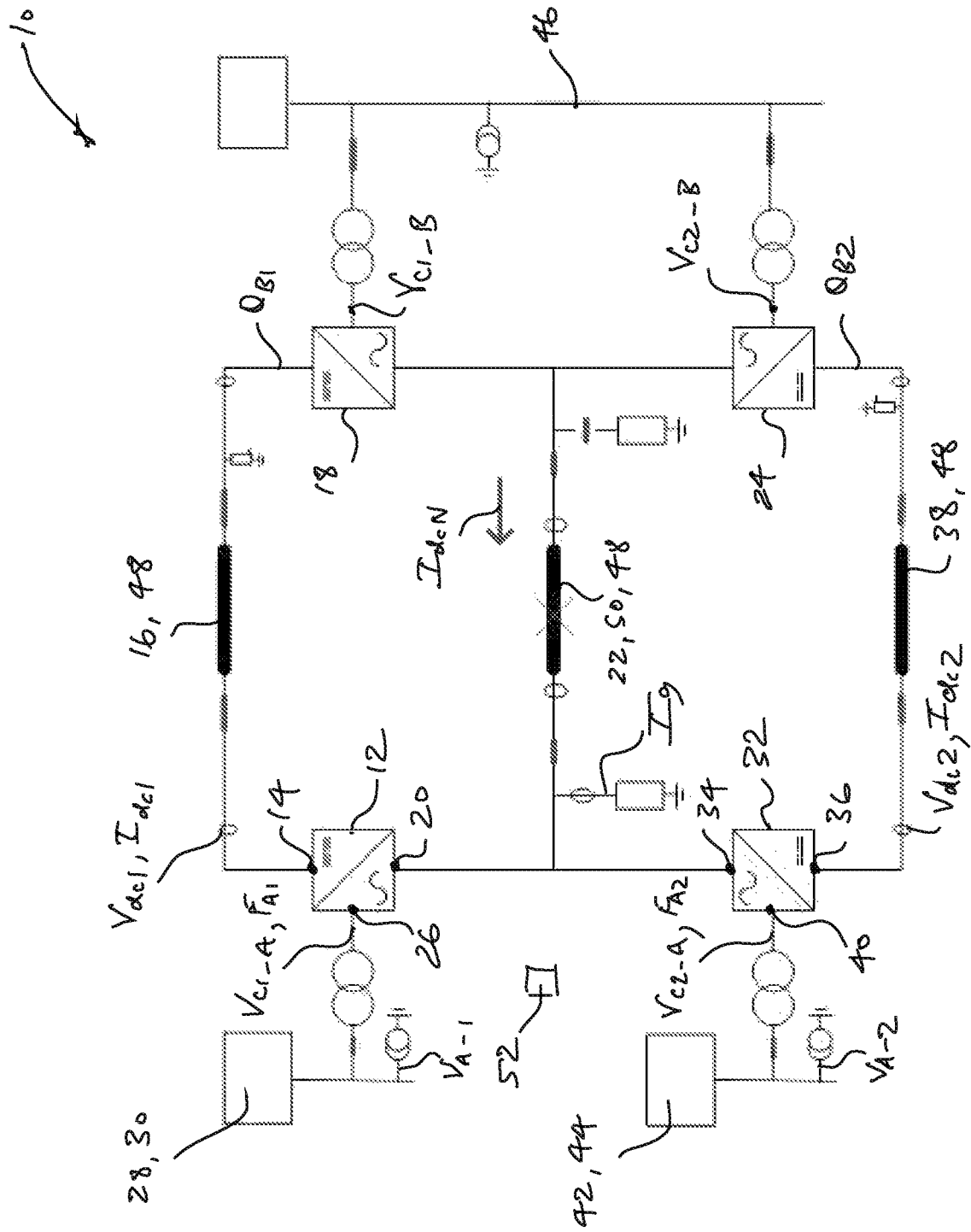

BIPOLE POWER TRANSMISSION NETWORKS

TECHNICAL FIELD

This invention relates to a bipole power transmission network and to a method of operating such a network.

BACKGROUND OF THE INVENTION

In high voltage direct current (HVDC) power transmission networks, AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

The choice of the most suitable power transmission network within a wider HVDC power transmission and distribution network differs, depending on the application and scheme features. One type of such a network is a bipole power transmission network.

SUMMARY OF THE INVENTION

According to a first aspect of the invention there is provided a bipole power transmission network comprising:
- a first upstream power converter having a first DC terminal connected with a first transmission conduit extending in-use to a first downstream power converter, a second DC terminal connected with a return conduit extending in-use to the first downstream power converter and a second downstream power converter, and at least one first AC terminal electrically connected with a first AC power source, whereby the first upstream power converter is configured to transfer power between the first AC power source and the first transmission conduit;
- a second upstream power converter having a third DC terminal connected with the return conduit, a fourth DC terminal connected with a second transmission conduit extending in-use to the second downstream power converter, and at least one second AC terminal electrically connected with a second AC power source, whereby the second upstream power converter is configured to transfer power between the second AC power source and the second transmission conduit; and
- an controller programmed to balance the current flowing in each of the first and second transmission conduits in the event of an issue preventing current from flowing in the return conduit, the upstream controller being further programmed to optimise the active power transferred downstream by the transmission conduit having a higher power output at the time of the failure by:
  setting a DC voltage reference that the upstream power converter connected with the transmission conduit having the lower power output at the time of the failure is required to operate the lower power transmission conduit at; and
  setting an AC voltage reference that the upstream power converter connected with the lower power transmission conduit is required to maintain at the or each corresponding AC terminal of the upstream power converter connected with the lower power transmission conduit.

Having the controller set a DC voltage reference that the lower power upstream power converter, i.e. the upstream power converter connected with the transmission conduit having a lower power output at the time of the return conduit failure, must operate the lower power transmission conduit at is a first step in achieving a balance of the current flowing in each of the first and second transmission conduits since it can be used to balance the ratio of power to voltage in each of the transmission conduits.

Additionally, setting an AC voltage reference that the lower power upstream power converter is required to maintain at the or each of its AC terminals advantageously permits the setting of a lower power DC voltage reference that the lower power upstream power converter must operate the lower power transmission conduit at to achieve current balancing, while reducing the risk of the lower power upstream power converter becoming over-modulated, which might otherwise occur if the DC voltage of the lower power transmission conduit falls below the peak AC voltage at the or each AC terminal of the lower power upstream power converter.

The controller may be programmed to set a DC voltage reference that is a function of the degree of current imbalance between the first and second transmission conduits.

Having the controller establish a relationship between the DC voltage reference and the degree of current imbalance between the first and second transmission conduits helps to drive the current flowing in the first and second transmission conduits towards a balanced condition as quickly as possible, and thereby further optimises operation of the bipole power transmission network of the invention.

Preferably the controller is programmed to set an AC voltage reference that is a function of one of the DC voltage reference or the degree of current imbalance between the first and second transmission conduits.

Having the controller establish a relationship between the AC voltage reference and the degree of current imbalance between the first and second transmission conduits, either directly or indirectly via the DC voltage reference, again helps to drive the current flowing in the first and second transmission conduits towards a balanced condition more quickly, and thereby further helps to optimise operation of the transmission network.

The controller may be programmed to optimise the active power transferred downstream by the transmission conduit having a higher power output at the time of the issue by additionally setting a reactive power exchange reference that the downstream power converter to which the lower power transmission conduit extends in-use must exchange in-use with the lower power transmission conduit.

Having a controller that is programmed to additionally set a reactive power exchange reference that the lower power downstream power converter, i.e. the downstream power converter to which the lower power transmission conduit extends, must exchange with that the lower power transmission conduit desirably further assists in the setting of a lower DC voltage reference that the lower power upstream power converter must operate the lower power transmission at to achieve current balancing, while again reducing the risk of the lower power downstream power converter becoming over-modulated, which might otherwise occur if the DC voltage of the lower power transmission conduit falls below the peak AC voltage of the lower power downstream power converter.

Optionally the controller is programmed to set a reactive power exchange reference that is a function of one of the DC voltage reference or the degree of current imbalance between the first and second transmission conduits.

Having the controller establish a relationship between the reactive power exchange reference and the degree of current imbalance between the first and second transmission conduits, either directly or indirectly via the DC voltage reference, further helps in driving the current flowing in the first and second transmission conduits towards a balanced condition quickly, and thereby still further optimises operation of the controller and associated bipole transmission network.

In a preferred embodiment of the invention the controller is programmed to optimise the active power transferred downstream by the transmission conduit having a higher power output at the time of the issue by additionally setting an AC frequency reference that the upstream power converter connected with the higher power transmission conduit must operate at to reduce the power provided by the AC power source connected therewith to the higher power transmission conduit.

Setting an AC frequency reference that the higher power upstream power converter, i.e. the upstream power converter connected with the transmission conduit having a higher power output at the time of the return conduit issue, is required to maintain at the or each of its AC terminals provides a reliable way of reducing the power provided by the AC power source, e.g. an offshore or onshore wind park, connected with the higher power upstream power converter, and thereby further assists in achieving current balancing in the first and second transmission conduits.

Preferably the controller is programmed to set an AC frequency reference that is a function of one of the DC voltage reference or the degree of current imbalance between the first and second transmission conduits.

Having the upstream controller establish a relationship between the AC frequency reference and the degree of current imbalance between the first and second transmission conduits, either directly or indirectly via the DC voltage reference, provides a further option to help drive the current flowing in the first and second transmission conduits towards a balanced condition, depending on the nature and controllability of the first AC power source.

In another preferred embodiment of the invention the controller is programmed when setting one or more of a respective DC voltage reference, AC voltage reference, or reactive power exchange reference, to consider a modulation index of the lower power transmission conduit.

The modulation index of the lower power transmission conduit may be based on a ratio of the peak AC voltage the upstream power converter connected with the lower power transmission conduit is able to provide and the DC voltage reference that the lower power upstream power converter is required to operate the lower power transmission conduit.

Such programmed steps help to ensure that the corresponding power converters are not called upon to operate outside their normal operating parameters and thereby helps to avoid the power converters going into an over modulation region of operation.

Optionally the controller is additionally programmed, when setting one or more of a respective DC voltage reference, AC voltage reference, reactive power exchange reference, or AC frequency reference, to check whether the reference to be set lies within predetermined operating parameters of the bipole transmission network.

Such a check by the controller additionally helps to ensured continued operation of the power converters and therefore ongoing availability of the bipole transmission network of the invention.

Preferably the controller is programmed to set one or more of a respective DC voltage reference, AC voltage reference, reactive power exchange reference, or AC frequency reference, by one of:
  carrying out a real time calculation of the respective reference;
  looking up a respective reference in a predetermined lookup table based on the degree of current imbalance between the first and second transmission conduits; and
  determining a respective reference by fitting the degree of current imbalance to a predetermined reference curve.

Carrying out a real time calculation provides for the setting of a given reference to achieve current balance the most speedily, while each of the look up and curve fitting approaches provide alternative options for setting a particular reference to achieve current balance and thereby allow for flexibility in operation of the controller.

According to a second aspect of the invention there is provided a method of operating a bipole power transmission network including,
  a first upstream power converter having a first DC terminal connected with a first transmission conduit extending in-use to a first downstream power converter, a second DC terminal connected with a return conduit extending in-use to the first downstream power converter and a second downstream power converter, and at least one first AC terminal electrically connected with a first AC power source, whereby the first upstream power converter is configured to transfer power between the first AC power source and the first transmission conduit, and
  a second upstream power converter having a third DC terminal connected with the return conduit, a fourth DC terminal connected with a second transmission conduit extending in-use to the second downstream power converter, and at least one second AC terminal electrically connected with a second AC power source, whereby the second upstream power converter is configured to transfer power between the second AC power source and the second transmission conduit,
  the method of operating the bipole power transmission network comprising the steps of:
  (a) balancing the current flowing in each of the first and second transmission conduits in the event of a issue preventing current from flowing in the return conduit; and
  (b) optimising the active power transferred downstream by the transmission conduit having a higher power output at the time of the issue by:
  setting a DC voltage reference that the upstream power converter connected with the transmission conduit having the lower power output at the time of the issue is required to operate the lower power transmission conduit; and
  setting an AC voltage reference that the upstream power converter connected with the lower power transmission conduit is required to maintain at the or each corresponding AC terminal of the upstream power converter connected with the lower power transmission conduit.

The method of the invention shares the benefits associated with the corresponding features of the bipole transmission network of the invention.

It will be appreciated that the use of the terms "first" and "second", and the like, in this patent specification is merely intended to help distinguish between similar features (e.g. the first and second transmission conduits, and the first and second upstream and downstream power converters), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWING

There now follows a brief description of preferred embodiments of the invention, by way of non-limiting example, with reference being made to FIG. 1 which shows a schematic view of a bipole transmission network according a first embodiment of the invention.

A bipole power transmission network according to a first embodiment of the invention is designated generally by reference numeral 10, as shown in FIG. 1.

DETAILED DESCRIPTION

The bipole transmission network 10 includes a first upstream power converter 12 which has a first DC terminal 14 that is connected with a first transmission conduit 16 which, in use, extends to a first downstream power converter 18. The first upstream power converter 12 also has a second DC terminal 20 that is connected with a return conduit 22 which, in use, also extends to the first downstream power converter 18 as well as to a second downstream power converter 24. Additionally, the first upstream power converter 12 includes three first AC terminals 26 (only one of which is shown for clarity) that are electrically connected with a first AC power source which, in the embodiment shown, is a first wind park 30, although this need not necessarily be the case. In other embodiments of the invention the first upstream power converter 12 may also include fewer than or more than three first AC terminals depending on the number of phases of the first AC power source.

The aforementioned configuration permits the first upstream power converter 12 to transfer power between the first AC power source 28, i.e. the first wind park 30, and the first transmission conduit 16.

The bipole transmission network 10 of the invention also includes a second upstream power converter 32.

The second upstream power converter 32 has a third DC terminal 34 which is connected with the return conduit 22, along with a fourth DC terminal 36 that is connected with a second transmission conduit 38 which, in use, extends to the second downstream power converter 24. The second upstream power converter 32 also has three second AC terminals 40 which are electrically connected with a second AC power source 42 in the form of a second wind park 44, although other forms of second AC power source are also possible.

Such a configuration similarly permits the second upstream power converter 32 to transfer power between the second AC power source 42, i.e. the second wind park 44, and the second transmission conduit 38.

In the embodiment shown the bipole power transmission scheme 10 of the invention includes only the first and second upstream power converters 12, 32 but other embodiments of the invention may also include the first and second downstream power converters 18, 24. Such other embodiments of the invention including also the first and second downstream power converters 18, 24 are applicable when a single entity owns and/or manages all of the power converters and associated AC power sources and downstream network(s).

Returning to the embodiment shown, the first and second transmission conduits 16, 38, i.e. first and second 'poles' (hence the network constituting a 'bipole' network), and the return conduit 22, permit the transfer of power between the first upstream and downstream power converters 12, 18 and between the second upstream and downstream power converters 32, 24, and more particularly in the embodiment shown, permit the first and second upstream power converters 12, 32 to transmit power to the first and second downstream power converters 18, 24.

Each of the first and second upstream power converters 12, 32 is, in the embodiment shown, located offshore, and so each of the first and second transmission conduits 16, 38 is or includes a subsea cable 48, although in other embodiments of the invention one or other transmission conduit might be, or include, an overhead line, an underground cable, or a mixture of such cables and line.

Meanwhile, the return conduit 22 is or includes a dedicated metallic return 50, which typically takes the same form as the first and second transmission conduits 16, 38, i.e. a further subsea cable 48, although an electrical conductor of some other form may be used as well as a ground return itself.

In addition to the foregoing, the bipole transmission network 10 of the invention also includes a controller 52 which (not shown) is arranged in operative communication with each of the upstream power converters 12, 32, and, in use, also with the downstream power converters 18, 24. In the embodiment shown the controller 52 is located upstream in the vicinity of the first and second upstream power converters 12, 32, although this need not be the case in other embodiments.

The controller 52 is programmed to balance the current $I_{dc1}$, $I_{dc2}$ flowing in each of the first and second transmission conduits 16, 38 in the event of a issue which prevents current $I_{dcN}$ from flowing in the return conduit 22, e.g. a loss of or failure relating to the dedicated metallic return 50 or the unavailability of the return conduit 22 as a result of it being repaired or otherwise undergoing some form of maintenance, any of which circumstances would ultimately lead to current $I_g$ flowing through ground, which is highly undesirable.

Additionally, the controller 52 is further programmed to optimise the active power transferred downstream by the transmission conduit 16, 38 that has a higher power output at the time of the issue.

More particularly, in the event of an issue associated with the return conduit 22, the controller 52 is programmed to measure one or both of the current $I_{dcN}$ flowing in the return conduit 22 and the current $I_g$ flowing to ground and, if either of these exceeds a predetermined error threshold, to establish that the currents $I_{dc1}$, $I_{dc2}$ flowing in the first and second transmission conduits 16, 38 are unbalanced.

Thereafter the controller 52 is programmed to determine which of the transmission conduits 16, 38 has a higher power output. On way in which the controller 52 may do this is by checking whether the current $I_{dcN}$ flowing in the return conduit 22 is positive or negative. A positive current flow in the return conduit 22 is indicative of the first transmission conduit 16 having a higher power output, while a negative current flow is indicative of the second transmission conduit 38 having a higher power output.

By way of example, the following description is based on the second transmission conduit 38 having a higher power output at the time of the return conduit 22 fault, but the associated steps and actions carried out apply equally, but to the opposite transmission conduit, in circumstances where the first transmission conduit 16 has the higher power output at the time of the fault.

Accordingly, by way of such an example, the controller 52 is programmed to optimise the active power transferred downstream by the second transmission conduit 38, i.e. the higher power transmission conduit, by first of all setting a DC voltage reference $V_{dc1}$ that the upstream power converter connected with the transmission conduit having the lower power output at the time of the issue, i.e. the first upstream power converter 12 connected with the first transmission conduit 16, is required to operate the lower power transmission conduit at, i.e. operate the first transmission conduit 16.

More particularly, the controller 52 sets a DC voltage reference $V_{dc1}$, that the first upstream power converter 12 must operate the first transmission conduit 16 at, that is a function of the degree of current imbalance between the first and second transmission conduits 16, 38. One way in which the controller 52 may do this is by setting a DC voltage reference $V_{dc1}$ according to:

$$V_{dc1} = \frac{P_{dc1}}{\left(\frac{P_{dc2}}{V_{dc2}}\right)}$$

where,
  $P_{dc1}$ is the active power transferred by the first transmission conduit 16;
  $P_{dc2}$ is the active power transferred by the second transmission conduit 38; and
  $V_{dc2}$ is voltage at which the second transmission conduit 38 is operating (which is assumed to be the maximum voltage that can be handled by the second transmission conduit 38).

The controller 52 may also take into account the degree of current imbalance between the first and second transmission conduits 16, 38 when setting a DC voltage reference $V_{dc1}$ by considering one or both of the current $I_{dcN}$ flowing in the return conduit 22 and the current $I_g$ flowing to ground.

The controller 52 is then programmed to continue optimising the active power $P_{dc2}$ transferred downstream by the second transmission conduit 38 by additionally setting an AC voltage reference $V_{A-1}$ that the upstream power converter connected with the lower power transmission conduit, i.e. the first upstream power converter 12 connected with the first transmission conduit 16, is required to maintain at each corresponding first AC terminal 26 of the first upstream power converter 12.

In the embodiment shown, the controller 52 is still further programmed to optimise the active power $P_{dc2}$ transferred downstream by the transmission conduit having a higher power output at the time of the issue, i.e. the second transmission conduit 38 in the example described herein, by additionally setting a reactive power exchange reference $Q_{B1}$ that the downstream power converter to which the lower power transmission conduit extends in-use, i.e. the first downstream power converter 18 to which the first transmission conduit 16 extends in-use, must exchange, in-use, with the lower power transmission conduit, i.e. the first transmission conduit 16.

Also, the controller 52 is yet still further programmed to optimise the active power $P_{dc2}$ transferred downstream by the second transmission conduit 38 by additionally setting an AC frequency reference $F_{A2}$ that the upstream power converter connected with the higher power transmission conduit, i.e. the second upstream power converter 32 connected with the second transmission conduit 38, must operate at to reduce the power provided by the second AC power source 42, i.e. the second wind park 44, to the higher power transmission conduit, i.e. the second transmission conduit 38.

Each of the aforementioned programming steps of setting a reactive power exchange reference $Q_{B1}$ and setting an AC frequency reference $F_{A2}$ are optional, and in other embodiments of the invention a controller 52 may not be programmed to carry out one or both such optional setting steps.

Returning to the embodiment shown, the controller 52 is programmed to set each of the AC voltage reference $V_{A-1}$ and the reactive power exchange reference $Q_{B1}$ as a function of the DC voltage reference $V_{dc1}$ it also sets. In other embodiments of the invention, the controller 52 may instead be programmed to set one or both of the AC voltage reference $V_{A-1}$ and the reactive power exchange reference $Q_{B1}$ directly as a function of the degree of current imbalance between the first and second transmission conduits, e.g. as a function of one or both of the current $I_{dcN}$ flowing in the return conduit 22 and the current $I_g$ flowing to ground.

More particularly the controller 52 is programmed, when setting respective AC voltage and reactive power exchange references $V_{A-1}$, $Q_{B1}$, to do so by establishing a modulation index for the lower power transmission conduit, i.e. the first transmission conduit 16, and also to check whether the reference $V_{A-1}$, $Q_{B1}$ to be set lies within predetermined operating parameters of the bipole transmission network 10.

The modulation index for the lower power transmission conduit, i.e. the first transmission conduit 16, is based on a ratio of the peak AC voltage $V_{C1\_A}$ the upstream power converter connected with the lower power transmission conduit, i.e. the first upstream power converter 12 connected with the first transmission conduit 16, is able to provide and the DC voltage reference $V_{dc1}$ that the lower power upstream power converter, i.e. the first upstream power converter 12, is required to apply to the lower power transmission conduit, i.e. the first transmission conduit 16.

More particularly still, the controller 52 is programmed to establish an upstream modulation index MI_A and a downstream modulation index MI_B for the first transmission conduit 16 to deal with both active and reactive power transfers.

The downstream modulation index MI_B for the first transmission conduit 16 is established according to:

$$MI\_B = \frac{V_{C1\_B}}{V_{dc1}}$$

where,
$V_{C1\_B}$ is the peak AC voltage the first downstream power converter 18 can provide; and
$V_{dc1}$ is the DC voltage the first upstream power converter 12 must operate the first transmission conduit 16 at.

The upstream modulation index MI_A for the first transmission conduit 16 is similarly established according to:

$$MI\_A = \frac{V_{C1\_A}}{V_{dc1}}$$

where,
$V_{C1\_A}$ is the peak AC voltage the first upstream power converter 12 can provide; and
$V_{dc1}$ is the DC voltage the first upstream power converter 12 must operate the first transmission conduit 16 at.

The controller 52 then checks whether both of the upstream and downstream modulation indices MI_A, MI_B are within a desired threshold and, if so, sends the DC voltage reference $V_{dc1}$ it has set to the first upstream power converter 12 to instruct the first upstream power converter 12 to operate the first transmission conduit 16 at that DC voltage. In those circumstances, i.e. neither desired thresholds being exceeded, the controller 52 also sends a further DC voltage reference $V_{dc2}$, i.e. the assumed maximum voltage the second upstream power converter 32 is able to provide, to the second upstream power converter 32 to instruct it to continue operating the second transmission conduit 38 at that maximum DC voltage.

If the upstream modulation index MI_A is outside the desired threshold then the controller 52 is programmed to calculate an AC voltage reference $V_{A-1}$ (that the first upstream power converter 12 connected with the first transmission conduit 16 is required to maintain at each of its first AC terminals 26) which results in a upstream modulation index MI_A that is less than 1.

Providing the calculated AC voltage reference $V_{A-1}$ is greater than a minimum AC voltage that might cause the first upstream power converter 12 to move into an overmodulation operating region, then it is set as the AC voltage reference $V_{A-1}$ that is sent to the first upstream power converter 12 for it to maintain at each of its first AC terminals 26.

Similarly, if the downstream modulation index MI_B is outside the desired threshold then the controller 52 is programmed to calculate a reactive power exchange reference Qin (that the first downstream power converter 18 must exchange, in-use, with the first transmission conduit 16) which similarly results in the downstream modulation index MI_B being less than 1.

Providing the calculated reactive power exchange reference $Q_{B1}$ is within a maximum reactive power exchange threshold (which is pre-calculated according to the capacitive capability of the second transmission conduit 38 and the maximum inductive capability of the downstream AC network 46), then it is set as the reactive power exchange reference $Q_{B1}$ that is sent to the first downstream power converter 18 to control the reactive power it must exchange, in-use, with the first transmission conduit 16.

The controller 52 is programmed to then calculate a minimum DC voltage reference $V_{dc1}$ that the first upstream power converter 12 is required to apply to the first transmission conduit 16 from a consideration of each of the upstream and downstream modulation indices MI_A, MI_B calculations set out above. More particularly, the controller 52 attempts to utilise the DC voltage reference $V_{dc1}$ calculated above, but if that cannot be achieved then a revised DC voltage reference $V_{dc1}$ which maintains each of the upstream and downstream modulation indices MI_A, MI_B below 1 is determined instead.

The controller 52 is then able to calculate an AC frequency reference $F_{A2}$ that the second upstream power converter 32 connected with the second transmission conduit 38 must operate at to reduce the power provided by the second AC power source 42, i.e. the second wind park 44, to the second transmission conduit 38. More particularly, the controller 52 is programmed to set an AC frequency reference $F_{A2}$ that is a function of the DC voltage reference $V_{dc1}$ set in the manner recited above (and thereby also a function, indirectly, of the degree of current imbalance between the first and second transmission conduits, e.g. as a function of one or both of the current $I_{dcN}$ flowing in the return conduit 22 and the current $I_g$ flowing to ground), and the controller 52 does this by first determining the required reduction in power $\Delta P$ from the second transmission conduit 38 according to:

$$\Delta P = \left| \left( \left( \frac{P_{dc2}}{V_{dc2}} \right) - \left( \frac{P_{dc1}}{V_{dc1}} \right) \right) * V_{dc2} \right|$$

where,
$P_{dc2}$ is the active power transferred by the second transmission conduit 38;
$V_{dc2}$ is voltage at which the second transmission conduit 38 is operating (which is assumed to be the maximum voltage that can be handled by the second transmission conduit 38);
$P_{dc1}$ is the active power transferred by the first transmission conduit 16; and
$V_{dc1}$ is voltage reference at which the first transmission conduit 16 is instructed to operate,
and from that, calculating the increase in AC frequency $\Delta F_{A2}$ that the second upstream power converter 32 is required to operate at according to:

$$\Delta F_{A2} = f(\Delta P)$$

Once all of the various references reference $V_{dc1}$, $V_{A-1}$, $Q_{B1}$, $F_{A2}$ have been calculated and set, the controller 52 is programmed to then send them to the corresponding power converter 12, 18, 24, 32 to instruct the corresponding power converter to operate accordingly.

In other embodiments of the invention (not shown) the controller may be programmed to set a respective reference by looking up the respective reference in a predetermined lookup table based on the degree of current imbalance between the first and second transmission conduits or by determining a respective reference by fitting the degree of current imbalance to a predetermined reference curve.

We claim:

1. A bipole power transmission network, comprising:
a first upstream power converter having a first DC terminal connected with a first transmission conduit extending in-use to a first downstream power converter, a second DC terminal connected with a return conduit extending in-use to the first downstream power converter and a second downstream power converter, and at least one first AC terminal electrically connected with a first AC power source, whereby the first upstream power converter is configured to transfer power between the first AC power source and the first transmission conduit;

a second upstream power converter having a third DC terminal connected with the return conduit, a fourth DC terminal connected with a second transmission conduit extending in-use to the second downstream power converter, and at least one second AC terminal electrically connected with a second AC power source, whereby the second upstream power converter is configured to transfer power between the second AC power source and the second transmission conduit; and a controller programmed to balance the current flowing in each of the first and second transmission conduits in an event of an issue preventing current from flowing in the return conduit, the controller being further programmed to optimise active power transferred downstream by the transmission conduit having a higher power output at the time of the issue by:

setting, based on a peak AC voltage at the or each corresponding AC terminal of the upstream power converter connected with the lower power transmission conduit, a DC voltage reference that the upstream power converter connected with the transmission conduit having the lower power output at the time of the issue is required to operate the lower power transmission conduit at; and setting, based on the peak AC voltage, an AC voltage reference that the upstream power converter connected with the lower power transmission conduit is required to maintain at the or each corresponding AC terminal of the upstream power converter connected with the lower power transmission conduit.

2. A bipole transmission network according to claim 1, wherein the controller is programmed to set the DC voltage reference that is a function of the degree of current imbalance between the first and second transmission conduits.

3. A bipole transmission network according to claim 1, wherein the controller is programmed to set the AC voltage reference that is a function of one of the DC voltage reference or the degree current imbalance between the first and second transmission conduits.

4. A bipole transmission network according to claim 1, wherein the controller is programmed to optimise the active power transferred downstream by the transmission conduit having a higher power output at the time of the issue by additionally setting a reactive power exchange reference that the downstream power converter to which the lower power transmission conduit extends in-use must exchange in-use with the lower power transmission conduit.

5. A bipole transmission network according to claim 1, wherein the controller is programmed to set a reactive power exchange reference that is a function of one of the DC voltage reference or the degree of current imbalance between the first and second transmission conduits.

6. A bipole transmission network according to claim 1, wherein the controller is programmed to optimise the active power transferred downstream by the transmission conduit having a higher power output at the time of the issue by additionally setting an AC frequency reference that the upstream power converter connected with the higher power transmission conduit must operate at to reduce the power provided by the AC power source connected therewith to the higher power transmission conduit.

7. A bipole transmission network according to claim 6, wherein the controller is programmed to set an AC frequency reference that is a function of one or both of the DC voltage reference or the degree of current imbalance between the first and second transmission conduits.

8. A bipole transmission network according to claim 1, wherein the controller is programmed when setting one or more of a respective DC voltage reference, AC voltage reference, or reactive power exchange reference, to consider a modulation index of the lower power transmission conduit.

9. A bipole transmission network according to claim 8, wherein the modulation index of the lower power transmission conduit is based on a ratio of the peak AC voltage the upstream power converter connected with the lower power transmission conduit is able to provide and the DC voltage reference that the lower power upstream power converter is required to operate the lower power transmission conduit.

10. A bipole transmission network according to claim 1, wherein the controller is programmed, when setting one or more of a respective DC voltage reference, AC voltage reference, reactive power exchange reference, or AC frequency reference, to check whether the reference to be set lies within predetermined operating parameters of the bipole transmission network.

11. A bipole transmission network according to claim 1, wherein the controller is programmed to set one or more of a respective DC voltage reference, AC voltage reference, reactive power exchange reference, or AC frequency reference, by one of:

carrying out a real time calculation of the respective reference;

looking up a respective reference in a predetermined lookup table based on the degree of current imbalance between the first and second transmission conduits; and determining a respective reference by fitting the degree of current imbalance to a predetermined reference curve.

12. A method of operating a bipole power transmission network including:

a first upstream power converter having a first DC terminal connected with a first transmission conduit extending in-use to a first downstream power converter, a second DC terminal connected with a return conduit extending in-use to the first downstream power converter and a second downstream power converter, and at least one first AC terminal electrically connected with a first AC power source, whereby the first upstream power converter is configured to transfer power between the first AC power source and the first transmission conduit, and a second upstream power converter having a third DC terminal connected with the return conduit, a fourth DC terminal connected with a second transmission conduit extending in-use to the second downstream power converter, and at least one second AC terminal electrically connected with a second AC power source, whereby the second upstream power converter is configured to transfer power between the second AC power source and the second transmission conduit, the method of operating the bipole power transmission network comprising the steps of:

(a) balancing the current flowing in each of the first and second transmission conduits in an event of an issue preventing current from flowing in the return conduit; and (b) optimising active power transferred downstream by the transmission conduit having a higher power output at the time of the issue by:

setting, based on a peak AC voltage at the or each corresponding AC terminal of the upstream power converter connected with the lower power transmission conduit, a DC voltage reference that the upstream power converter connected with the transmission conduit having the lower power output at the time of the issue is required to operate the lower power transmission conduit; and setting, based on the peak AC voltage, an AC voltage reference that the upstream power converter connected with the lower power transmission conduit is required to maintain at the or each corresponding AC terminal of the upstream power converter connected with the lower power transmission conduit.

13. The method of claim 12, further comprising:

setting the DC voltage reference based on a function of the degree of current imbalance between the first and second transmission conduits.

14. The method of claim 12, further comprising:

setting the AC voltage reference based on a function of one of the DC voltage reference or the degree current imbalance between the first and second transmission conduits.

15. The method of claim 12, further comprising:

setting a reactive power exchange reference that the downstream power converter to which the lower power transmission conduit extends in-use must exchange in-use with the lower power transmission conduit.

16. The method of claim 12, further comprising:

setting a reactive power exchange reference that is a function of one of the DC voltage reference or the degree of current imbalance between the first and second transmission conduits.

17. The method of claim 12, further comprising:

setting an AC frequency reference that the upstream power converter connected with the higher power transmission conduit must operate at to reduce the power provided by the AC power source connected therewith to the higher power transmission conduit.

18. The method of claim 17, further comprising:

setting an AC frequency reference that is a function of one or both of the DC voltage reference or the degree of current imbalance between the first and second transmission conduits.

19. The method of claim 12, wherein setting one or more of a respective DC voltage reference, AC voltage reference, or reactive power exchange reference, is based on a modulation index of the lower power transmission conduit.

20. The method of claim 19, wherein the modulation index of the lower power transmission conduit is based on a ratio of the peak AC voltage the upstream power converter connected with the lower power transmission conduit is able to provide and the DC voltage reference that the lower power upstream power converter is required to operate the lower power transmission conduit.

* * * * *